US012773703B1

(12) United States Patent
Luo et al.

(10) Patent No.: US 12,773,703 B1
(45) Date of Patent: Oct. 27, 2026

(54) ATOMIZING DISPENSER WITH FILTERING STRUCTURE, AND BOTTLE HAVING SUCH DISPENSER

(71) Applicant: Foshan Deyuxin Technology Co., Ltd., Foshan City (CN)

(72) Inventors: Zhiming Luo, Foshan City (CN); Hanbin Weng, Foshan City (CN)

(73) Assignee: Foshan Deyuxin Technology Co., Ltd., Foshan City (CN)

( * ) Notice: Subject to any disclaimer, the term of this patent is extended or adjusted under 35 U.S.C. 154(b) by 0 days.

(21) Appl. No.: 19/418,054

(22) Filed: Dec. 12, 2025

(51) Int. Cl.
*B05B 11/00* (2023.01)
*B05B 15/40* (2018.01)

(52) U.S. Cl.
CPC .......... *B05B 11/0008* (2013.01); *B05B 15/40* (2018.02)

(58) Field of Classification Search
CPC . B05B 15/40; B05B 11/0008; B05B 11/0027; B05B 11/1001; B05B 11/1004; B05B 11/1012; B05B 11/1014; B05B 11/1015; B05B 11/1025; B05B 11/1052; B05B 11/105
USPC ..................................... 222/383.1, 384, 385
See application file for complete search history.

(56) References Cited

U.S. PATENT DOCUMENTS

| | | | |
|---|---|---|---|
| 2011/0089252 A1 | 4/2011 | Rosener et al. | |
| 2021/0146391 A1 | 5/2021 | Heinzle et al. | |
| 2025/0161968 A1* | 5/2025 | Burmann | B05B 11/1077 |

FOREIGN PATENT DOCUMENTS

| | | | | |
|---|---|---|---|---|
| CN | 114834730 A | | 8/2022 | |
| CN | 113233000 B | * | 9/2022 | B05B 11/1043 |
| CN | 223221708 U | | 8/2025 | |
| WO | WO-2018108535 A1 | * | 6/2018 | B05B 11/1047 |
| WO | 2019161556 A1 | | 8/2019 | |

* cited by examiner

*Primary Examiner* — Jennifer C Chiang
(74) *Attorney, Agent, or Firm* — MUNCY, GEISSLER, OLDS & LOWE, P.C.

(57) ABSTRACT

An atomizing dispenser with a filtering structure is provided, as well as a bottle having such dispenser, wherein the atomizing dispenser comprises a push button, a nozzle, a pump assembly, a tube, and an elastic element; the nozzle being provided in the push button, and the pump assembly being provided in an inner cavity of the tube; the pump assembly comprises an upper pump component and a lower pump component; the upper pump component being provided with a liquid channel in fluid communication with the nozzle and a sealing ring configured to seal and press against an inner wall of the tube; the lower pump component comprises a filter cover for filtering impurities from a liquid, wherein the filter cover is provided with a plurality of liquid outlets; the elastic element is positioned between a bottom of the inner wall of the tube and the filter cover.

12 Claims, 9 Drawing Sheets

ATOMIZING DISPENSER WITH FILTERING STRUCTURE, AND BOTTLE HAVING SUCH DISPENSER

FIELD OF TECHNOLOGY

The following relates to the technical field of atomized spray technology, in particular to an atomizing dispenser with a filtering structure, and a bottle having such dispenser.

BACKGROUND

An atomizing dispenser mainly operates by using compressed air to drive the liquid forming a high-speed airflow that is sprayed through a nozzle, to finally produce atomized droplets. Consequently, the atomizing dispenser is often applied in the field of perfumes, liquid medicines and others. To enable the liquid to form the high-speed atomized spray, a spray orifice of the nozzle is generally designed to be narrow. If the nozzle is blocked by impurities, the pump will suffer from poor atomized effect or may not be available further. The impurities that cause the nozzle blockage include those originating from the liquid intended for atomized spray, but not limited to sediments, essential oil particles, flocculent matters, or external contaminants. To prevent the atomizing dispenser from blockage, it is necessary to improve a dispenser structure in the prior art.

SUMMARY

In order to overcome the above-mentioned defects in the prior art, an aspect of the present disclosure is to provide an atomizing dispenser with a filtering structure, and a bottle having such dispenser.

To solve the technical problem, an aspect of the present disclosure is to provide:

- an atomizing dispenser with a filtering structure, comprising a push button, a nozzle, a pump assembly, a tube, and an elastic element; the nozzle being provided in the push button, and the pump assembly being provided in an inner cavity of the tube;
- wherein the pump assembly comprises an upper pump component and a lower pump component, the upper pump component being provided with a liquid channel in fluid communication with the nozzle and a sealing ring configured to seal and press against an inner wall of the tube, and the lower pump component being provided with a filter cover for filtering impurities from a liquid, wherein the filter cover is provided with a plurality of liquid outlets; the elastic element is positioned between a bottom of the inner wall of the tube and the filter cover; under non-working condition of the elastic element, the lower pump component presses against the upper pump component by an elastic force of the elastic element, to close the liquid channel; and a one-way valve is disposed at the bottom of the inner cavity of the tube to allow the liquid to flow in.

By providing the filter cover, the present disclosure enables the impurities to be removed from the liquid as it passes through the filter cover. Consequently, the sprayed liquid does not contain large-particle impurities, thereby protecting the nozzle from damage and blockage, and extending the service life of the atomizing dispenser. When the push button is pressed, it actuates the pump assembly to move synchronously and downward, compressing the internal space of the tube. Once the internal pressure on the tube reaches a certain level, the liquid has a sufficient pressure or impact force to separate the upper pump component and the lower pump component, thereby opening the liquid channel. The liquid is then rapidly sprayed out and atomized outward through the nozzle.

In a preferred embodiment of the present disclosure, the upper pump component and the lower pump component are coaxial; the liquid channel comprises a liquid passage in fluid communication with a nozzle and a connection passage positioned below and in communication with said liquid passage, wherein the connection passage has a larger inner diameter than the liquid passage; the lower pump component further comprises a rod embedded in the connection passage, wherein a first gap is formed between the rod and an inner wall of the connection passage, and the filter cover is connected to a lower end of the rod; and under non-working condition of the elastic element, an upper end of the rod presses against a lower end of the liquid passage by an elastic force of the elastic element, to form a seal.

In a preferred embodiment of the present disclosure, the sealing ring is connected to a lower end of the upper pump component and is in single line contact with the inner wall of the tube.

In a preferred embodiment of the present disclosure, the dispenser further comprises a locking cap for preventing the pump assembly from ejection; the locking cap is assembled and fixed on the tube, and is provided with a space to enable the upper pump component to pass through; an outer wall of the upper pump component is provided with a first limit extending radially and outward, and the locking cap is provided with a second limit narrowing radially and inward; and under non-working condition, the second limit blocks the first limit to prevent the pump assembly from ejection.

In a preferred embodiment of the present disclosure, the filter cover comprises a filter plate where the liquid outlets are provided on.

Preferably, the filter cover further comprises an extension cylinder being connected with the filter plate and extending downward.

Preferably, the filter cover further comprises a cylinder connected with the filter plate and extending upward, and an inner cavity of the cylinder is communicated with an inner cavity of the extension cylinder.

In a preferred embodiment of the present disclosure, the plurality of liquid outlets are configured to form one or more liquid paths, wherein the plurality of liquid outlets are arranged and distributed circumferentially in each of the liquid paths, and each of the liquid paths is arranged circumferentially with a same center.

Preferably, two liquid paths are provided, and one end of the elastic element is pressed against and positioned between the two liquid paths.

In a preferred embodiment of the present disclosure, a gas vent is provided through a wall of the tube and positioned above the sealing ring; a recess is provided on the inner wall of the tube and positioned below the gas vent; and when the sealing ring moves to the recess, a second gap is formed between the sealing ring and the recess, allowing the gas to pass through.

Preferably, the dispenser further comprises an outer cap, wherein the outer cap comprises a first connection and a second connection, each of the first connection and the second connection is provided with an internal cavity, and the first connection has an opening on the top while the second connection has an opening at the bottom; the tube engages with an inner wall of the internal cavity of the first connection, and the upper pump component extends through the opening on the top of the first connection; and the second connection is configured to be connected with a bottle body, wherein the bottle body communicates with the gas vent when being fixedly connected to the second connection.

In a preferred embodiment of the present disclosure, all the components of the atomizing dispenser are made of plastic materials.

A second aspect of the present disclosure is to provide a bottle having the above-mentioned atomizing dispenser.

Provided is a bottle, comprising a bottle body and the atomizing dispenser with a filtering structure.

Compared with the prior art, the present disclosure has the following benefits:

By providing the filter cover, the present disclosure enables the impurities to be removed from the liquid as it passes through the filter cover. Consequently, the sprayed liquid does not contain large-particle impurities, thus protecting the nozzle from damage and blockage, and extending the service life of the atomizing dispenser.

BRIEF DESCRIPTION OF DRAWINGS

In order to more clearly describe the technical solutions in the embodiments of the present disclosure, the drawings used in the description of the embodiments will be briefly introduced below. Apparently, the drawings in the following description only show some embodiments of the present disclosure. For those ordinary skilled in the art, other drawings can be derived from these drawings without creative effort.

REFERENCE NUMBERS

Figure 1:
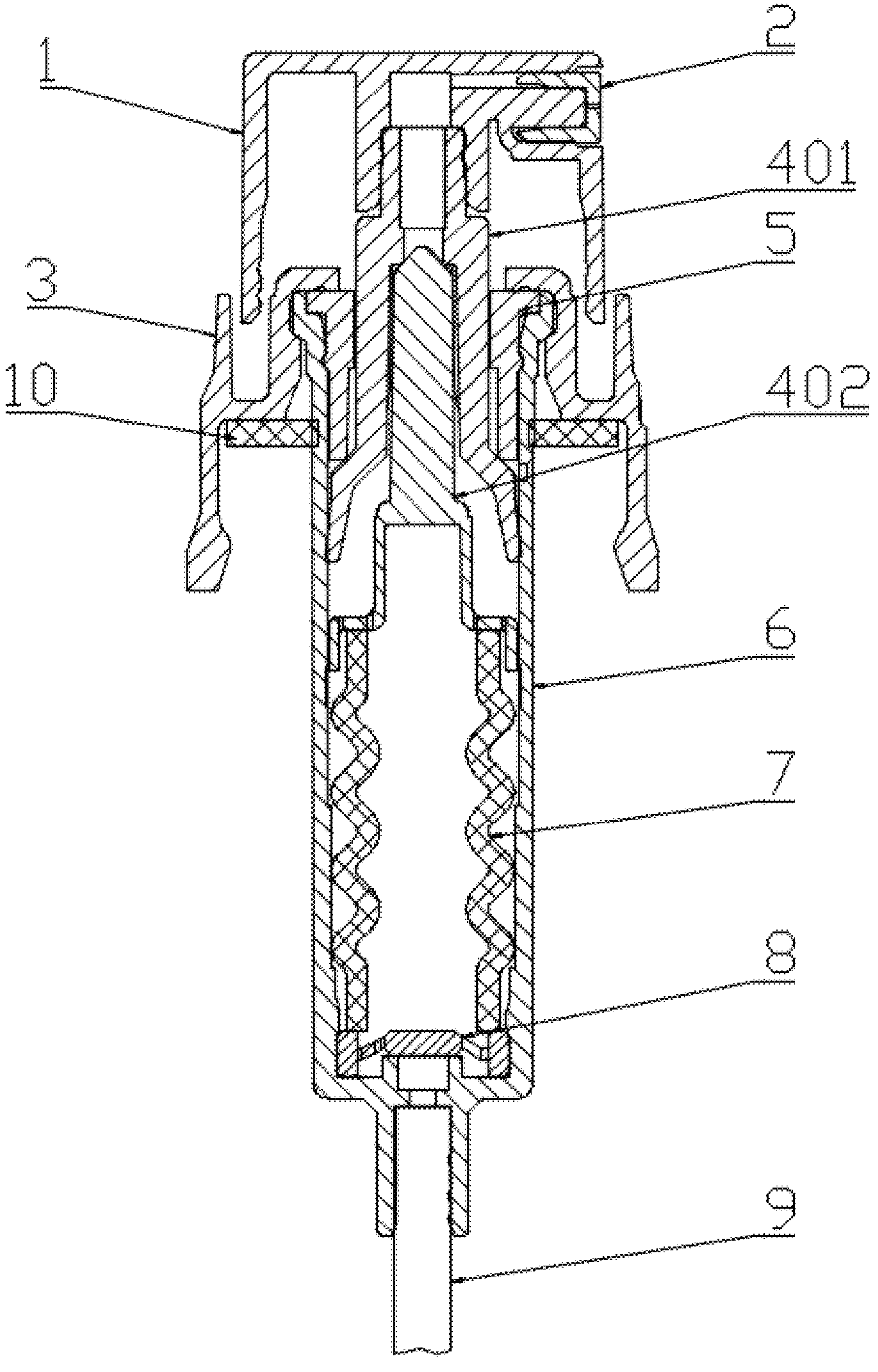
FIG. 1 is a first sectional view of an atomizing dispenser with a filtering structure of one embodiment according to the present disclosure.

1—Push button
101—Boss
102—Transition channel
2—Nozzle
3—Outer cap
301—First connection
302—Second connection
4—Pump assembly
401—Upper pump component
4011—Liquid passage
4012—Connection passage,
4013—First gap
4014—Sealing ring
4015—First limit
4016—Assembled column
402—Lower pump component
4021—Rod
4022—Filter cover
40221Cylinder
40222—Filter plate
40223—Extension cylinder
40224—Liquid outlet;
5—Locking cap
501—Second limit
6—Tube
601—Gas vent
602—Recess
603—Limiting step
604—Stop
605—Liquid inlet
7—Elastic element
701—Notch
8—One—way valve
9—Pipette
10—Gasket.

DETAILED DESCRIPTION OF THE INVENTION

In order to more clearly understand the above-mentioned objectives, features and advantages of the present disclosure, the present disclosure will be described in detail below with reference to the accompanying drawings and specific embodiments. It should be noted that the embodiments and features in the embodiments of the present application can be combined with each other without conflicts. A plurality of specific details are described in the following description to facilitate comprehensively understanding of the present disclosure; however the described embodiments are only a part of the embodiments of the present disclosure, rather than all of the embodiments. Based on the embodiments of the present disclosure, all other embodiments obtained by those ordinary skilled in the art shall fall within the protective scope of the present disclosure without creative effort.

Unless otherwise defined, all technical and scientific terms used herein have the same meanings as those commonly understood by those skilled in the art to which the present disclosure belongs. Herein, the terms used in the description of the present disclosure are only for the purpose of describing specific embodiments, and are not intended to limit the present disclosure.

Embodiment 1

Referring to FIGS. 1 to 9, this embodiment discloses an atomizing dispenser with a filtering structure, comprising a push button 1, a nozzle 2, a pump assembly 4, a tube 6, an elastic element 7, an outer cap 3, a locking cap 5, etc. The nozzle 2 is provided in the push button 1, and the pump assembly 4 and the locking cap 5 are provided in an inner cavity of the tube 6.

In this embodiment, the pump assembly 4 comprises an upper pump component 401 and a lower pump component 402, and the upper pump component 401 and the lower pump component 402 are coaxial. The upper pump component 401 is provided with a liquid channel in fluid communication with the nozzle 2 and a sealing ring 4014 configured to seal and press against an inner wall of the tube 6. The lower pump component 402 is provided with a filter cover

4022 for filtering impurities from a liquid, wherein the filter cover 4022 is provided with a plurality of liquid outlets 40224, and a liquid cavity is formed between the filter cover 4022 and a bottom of an inner wall of the tube 6. The elastic element 7 is positioned between the bottom of the inner wall of the tube 6 and the filter cover 4022. Under non-working condition of the elastic element 7, the lower pump component 402 presses against the upper pump component 401 by elastic force of the elastic element 7, to close the liquid channel. A one-way valve 8 is disposed at the bottom of the inner cavity of the tube 6 to allow the liquid to flow in. The term "under the non-working condition of the elastic element" refers to a non-compressed state or a natural state of the elastic element 7. In this case, the elastic force of the elastic element 7 can cause the lower pump component 402 and the upper pump component 401 to mutually press against each other, thereby achieving a seal of the liquid channel.

By providing the filter cover 4022, the present disclosure enables the impurities to be removed from the liquid as it passes through the filter cover 4022. Consequently, the sprayed liquid does not contain large-particle impurities, thereby protecting the nozzle 2 from damage and blockage, and extending the service life of the atomizing dispenser. When the push button is pressed, it actuates the pump assembly 4 to move synchronously and downward, compressing the internal space of the tube 6. Once the internal pressure on the tube 6 reaches a certain level, the liquid has a sufficient pressure or impact force to separate the upper pump component 401 and the lower pump component 402, opening the liquid channel. The liquid is then rapidly sprayed out and atomized outward through the nozzle 2.

Further, the liquid channel comprises a liquid passage 4011 in fluid communication with a nozzle 2 and a connection passage 4012 positioned below and in communication with said liquid passage 4011, wherein the connection passage 4012 has a larger inner diameter than the liquid passage 4011. The lower pump component 402 further comprises a rod 4021 embedded in the connection passage 4012, wherein a first gap 4013 is formed between the rod and an inner wall of the connection passage 4012, and the filter cover 4022 is connected to a lower end of the rod 4021. Under non-working condition of the elastic element 7, an upper end of the rod 4021 presses against a lower end of the liquid passage 4011 by the elastic force of the elastic element 7, to form a seal.

To ensure tightly pressing and sealing effects between the upper end of the rod 4021 and the lower end of the liquid passage 4011, in this embodiment, the upper end of the rod 4021 is formed as a conical, and its tapered surface tightly presses against the lower end of the liquid passage 4011. In this embodiment, the first gap 4013, which is formed by inserting the rod 4021 into the connection passage 4012, is configured to reduce the internal space during the liquid spray. This configuration maintains a sufficient pressure during the liquid spray, thereby ensuring that the liquid is sprayed out with a sufficient explosive force and the atomized spray effect can be improved.

In this embodiment, to facilitate the smooth liquid spray, an assembled column 4016, which can be properly adapted to engage with the push button 1, is arranged on the upper end of the upper pump component 401. A boss 101 can be properly adapted to engage with the assembled column 4016, and a transition channel 102 is in communication with the liquid passage 4011, both are both arranged within the push button 1. In this embodiment, the connection and liquid spray between the push button 1 and the upper pump component 401, and between the nozzle 2 and the push button 1, may be implemented using the conventional techniques in the art.

Figure 2:
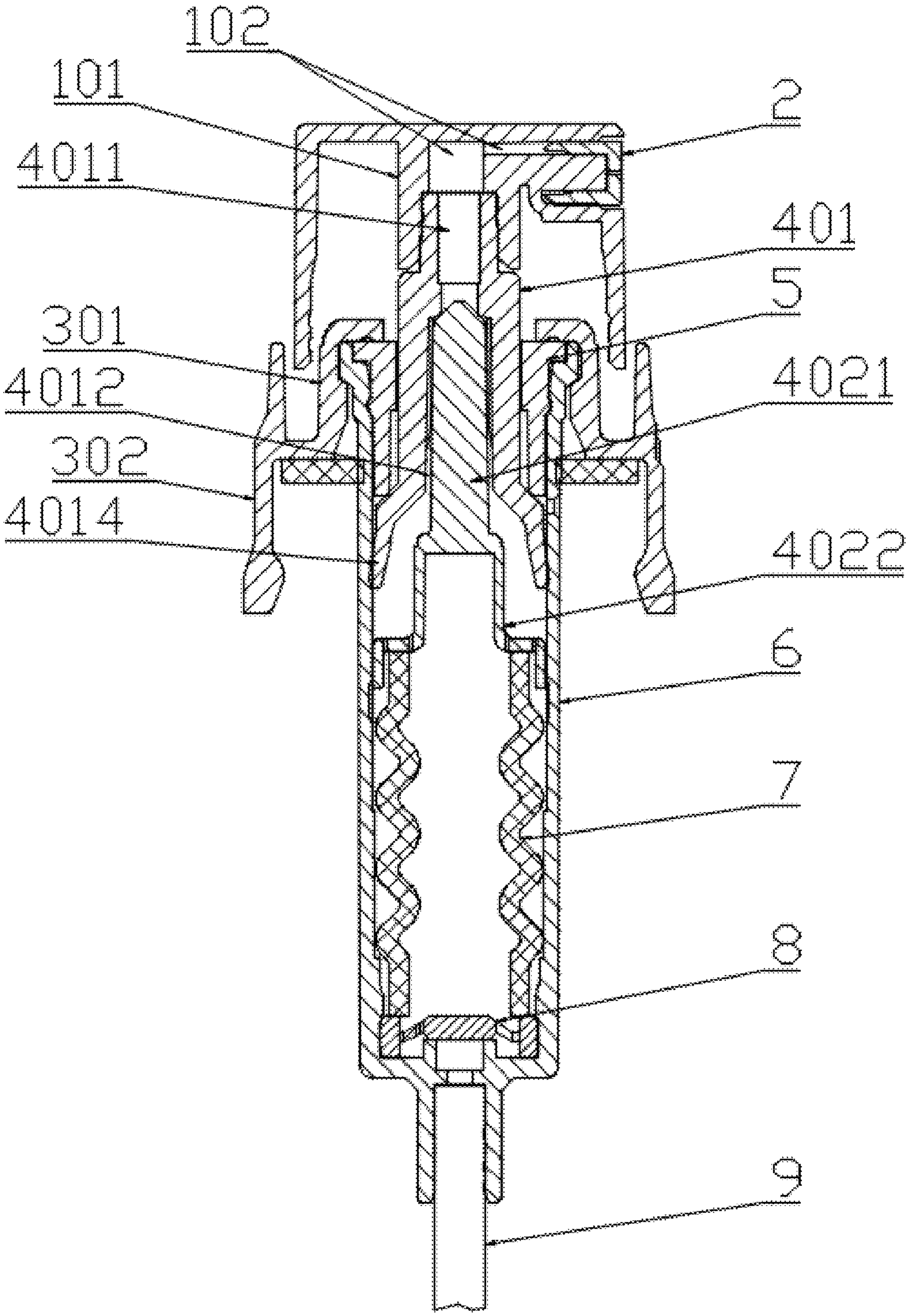
FIG. 2 is a second sectional view of an atomizing dispenser with a filtering structure of the embodiment according to the present disclosure.

In this embodiment, the sealing ring 4014 is connected to a lower end of the upper pump component 401 and is in single line contact with the inner wall of the tube 6. As shown in FIGS. 1 and 2, the sealing ring 4014 has only a single circumferential line contact with the inner wall of the tube 6. This configuration significantly reduces the pressure for pressing the push button 1, allowing users to easily complete a pressing spray action. The easy pressing spray action can also increase a pressing speed appropriately, thereby making the internal liquid inside the tube 6 have a higher explosive force for liquid spray.

In this embodiment, the sealing ring 4014 can be adapted to use in a perfume dispenser, a liquid atomizing dispenser, a piston and others in the prior art. In another embodiment, the sealing ring 4014 is designed to be in dual-line sealing contact with the inner wall of the tube 6, thereby providing improved sealing effect. The specific structural design of the sealing ring 4014 can be flexibly adapted.

Further, in this embodiment, the sealing ring 4014 and the upper pump component 401 form an integrated structure. In an alternative embodiment, the sealing ring 4014 and the upper pump component 401 form a separated structure that is assembled by mutual engagement to provide a sealed connection.

Figure 3:
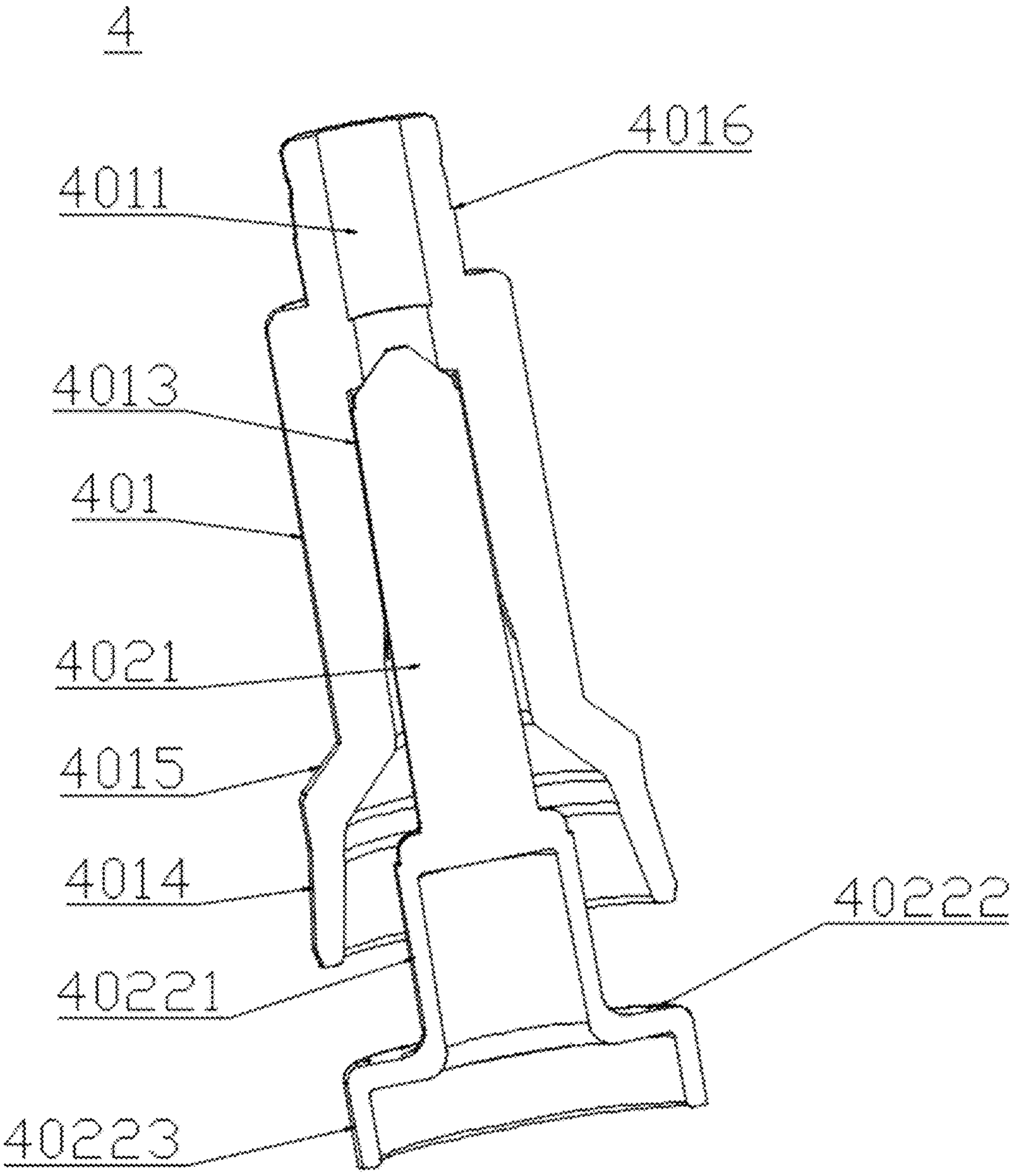
FIG. 3 is an elevation sectional view of a pump assembly.
Figure 4:
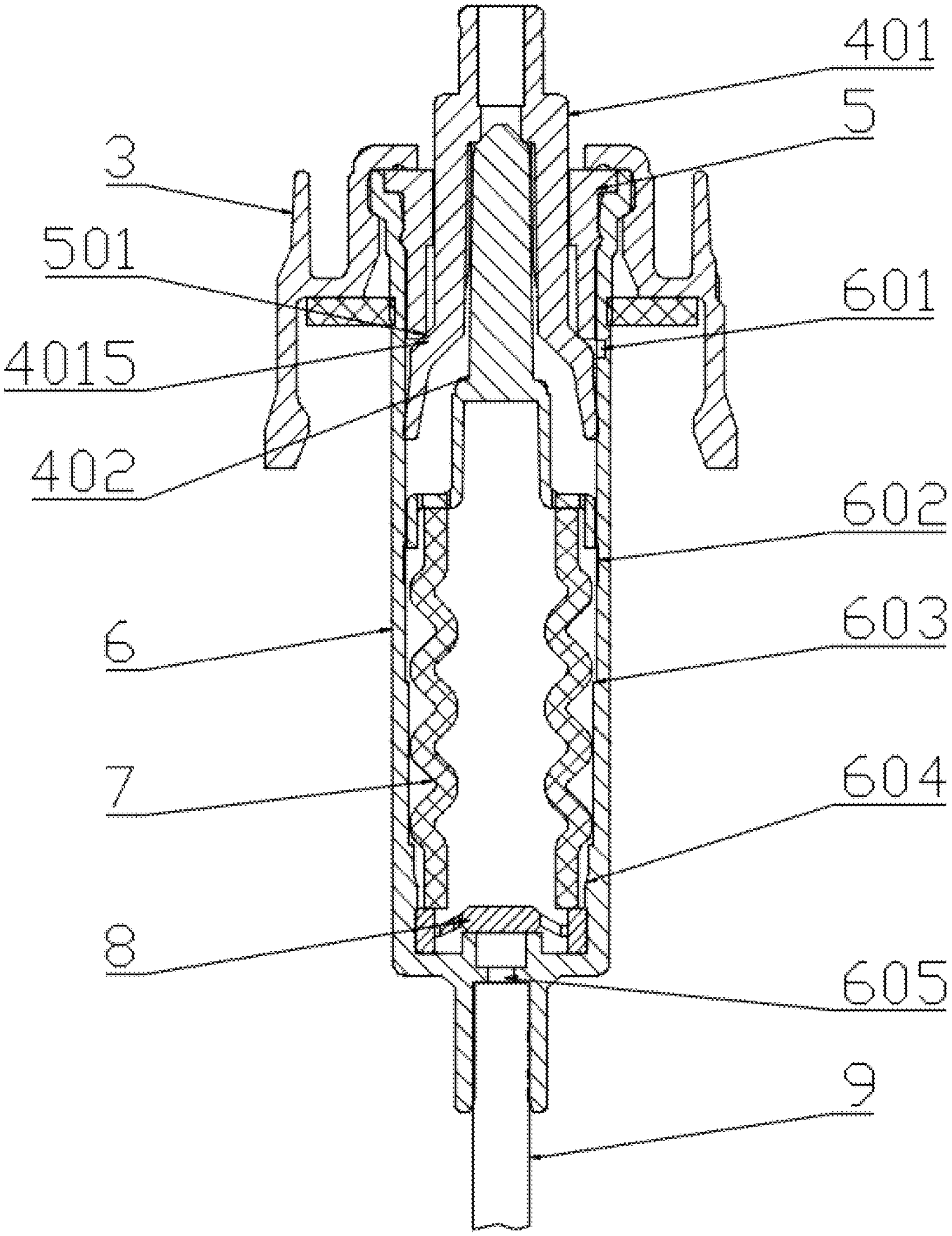
FIG. 4 is a sectional view of the pump assembly, with a push button and a nozzle hidden.
Figure 5:
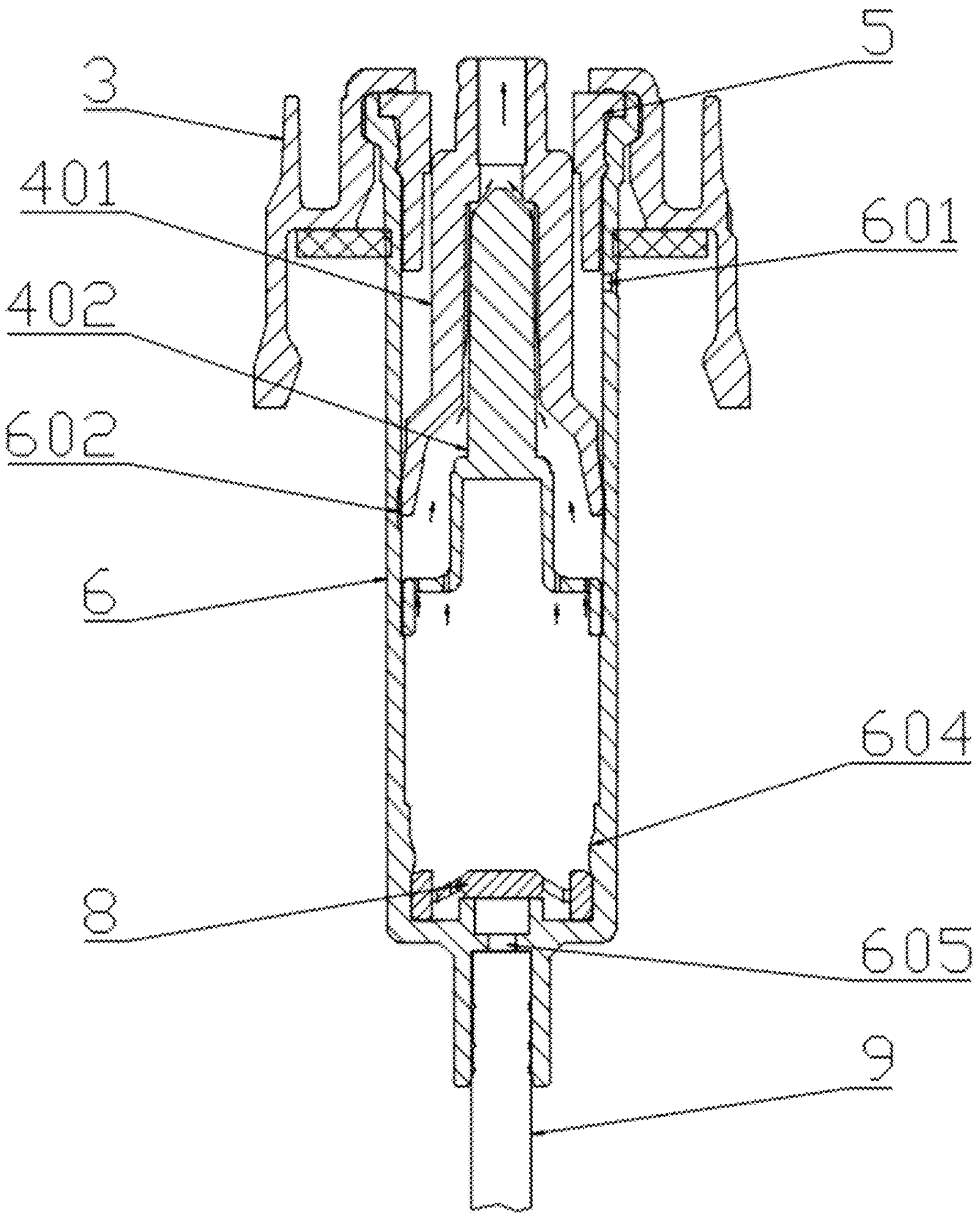
FIG. 5 is a sectional view of the pump assembly moved downward, with a push button, a nozzle and an elastic element hidden, wherein an arrow indicates the direction of liquid spray.
Figure 6:
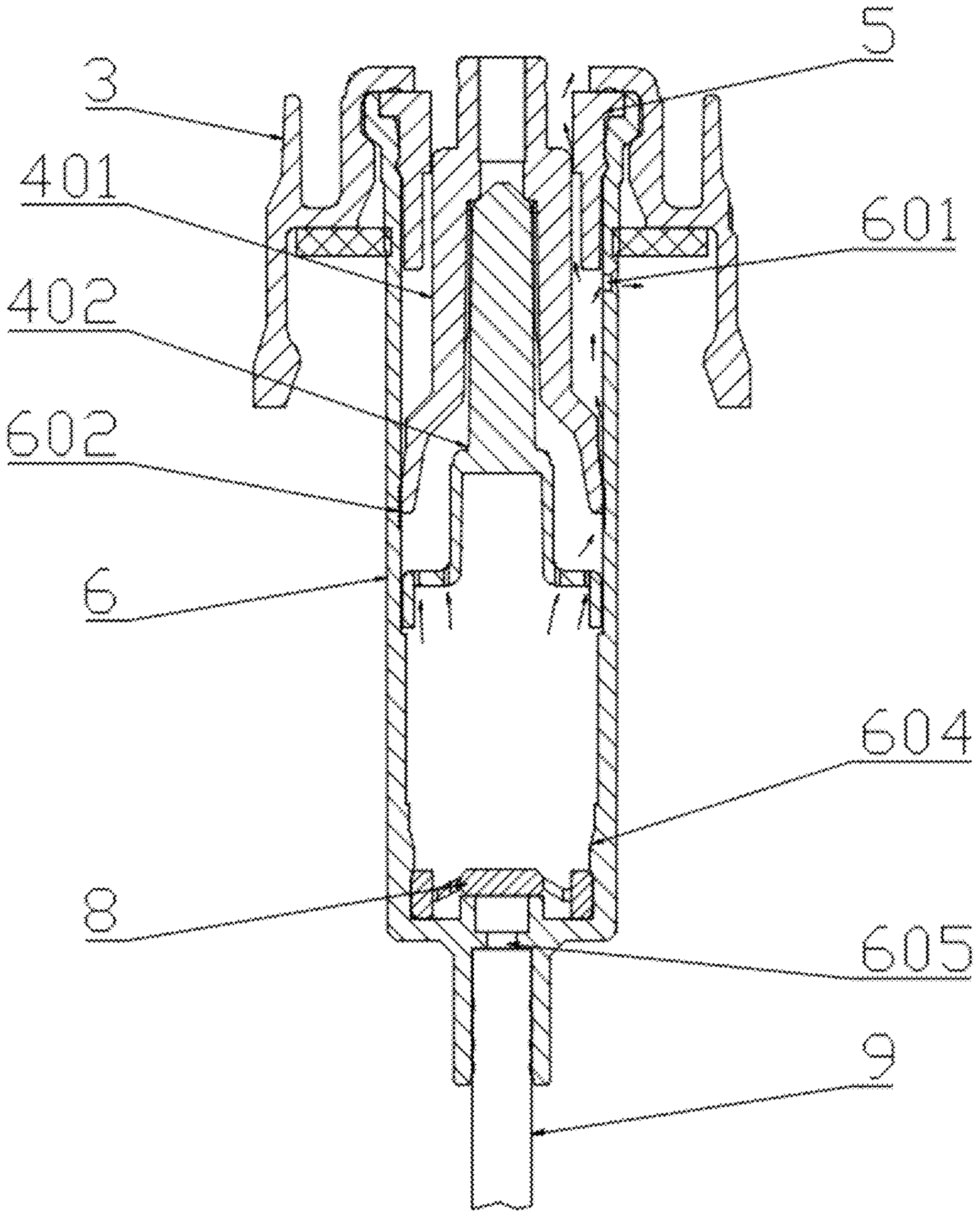
FIG. 6 is a sectional view of the pump assembly moved downward, with a push button, a nozzle and an elastic element hidden, wherein an arrows indicates the direction of gas ejection through the gas vent and a third gap between a locking cap and an upper pump component.

In this embodiment, the locking cap 5 is assembled and fixed on the tube 6 and is provided with a space to enable the upper pump component 401 to pass through. An outer wall of the upper pump component 401 is provided with a first limit 4015 extending radially and outward. The locking cap 5 is provided with a second limit 501 narrowing radially and inward. Under non-working condition, the second limit 501 blocks the first limit 4015 to prevent the pump assembly 4 from ejecting. Specifically, in this embodiment, a transition ring extending radially outward is disposed between the upper pump component 401 and the sealing ring 4014, and serves as the first limit 4015; the locking cap 5 is positioned on the upper end of the inner cavity of the tube 6, and an inner ring of a lower end of the locking cap 5 serves as the second limit 501. The first and second limits press against each other to prevent the pump assembly 4 from ejection, as shown in FIG. 3.

In this embodiment, the filter cover 4022 comprises a filter plate 40222, an extension cylinder 40223, and a cylinder 40221. The liquid outlets 40224 are provided on the filter plate 40222. The extension cylinder 40223 is connected with the filter plate 40222 and extends downward. Specifically, referring to FIGS. 3, 7, and 8, the extension cylinder 40223 is connected to an outer periphery of the filter plate 40222 and is adapted to fit against the inner wall of the tube 6, thereby forming a shroud-like structure. The cylinder 40221 is connected to the filter plate 40222 and extends upward, with an inner cavity of the cylinder 40221 in communication with an inner cavity of the extension cylinder 40223. By disposing such filter cover 4022, in this manner, the filter plate 40222 provides a suitable structure for arranging the liquid outlets 40224, and the cylinder 40221 can appropriately increase the internal volume of the tube 6 for storing the liquid in the tube 6, such that more liquid is stored, facilitating an increased atomized spray volume.

Figure 7:
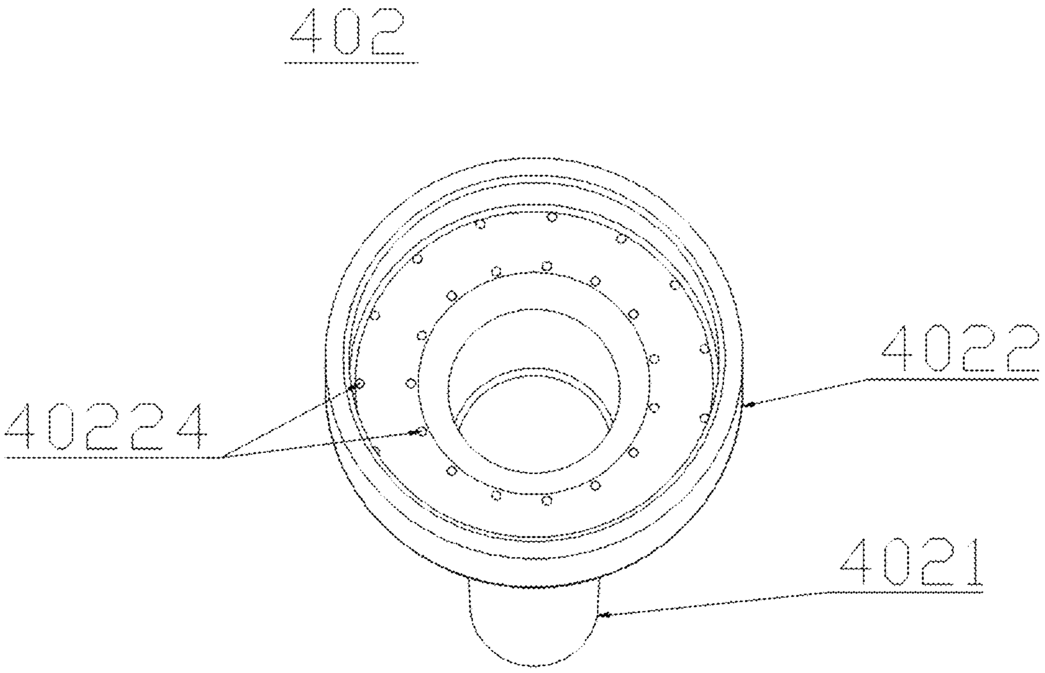
FIG. 7 is a first perspective view of a lower pump component.
Figure 8:
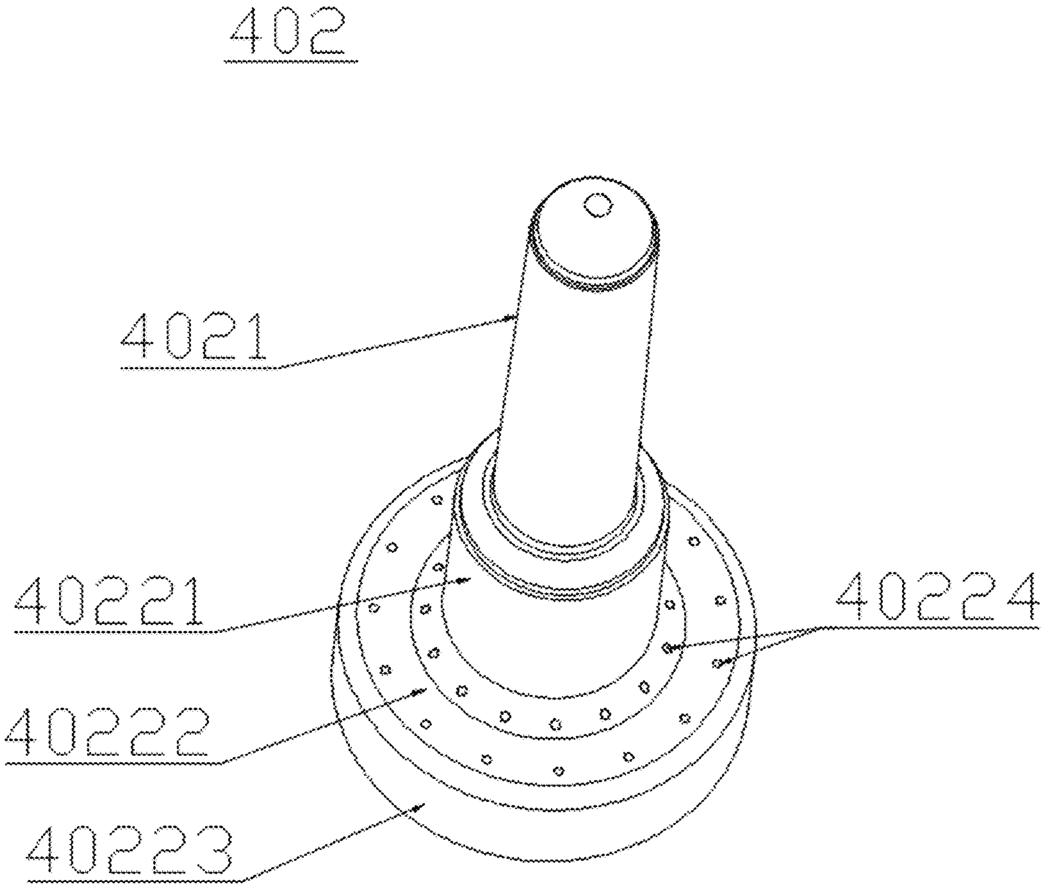
FIG. 8 is a second perspective view of a lower pump component.

Referring to FIGS. 7 and 8, in this embodiment, the plurality of liquid outlets 40224 are configured to form one or more liquid paths, wherein the plurality of liquid outlets 40224 are arranged and distributed circumferentially in each of the liquid paths, and each of the liquid paths is arranged circumferentially with a same center. The liquid outlets 40224 can be spaced uniformly or arbitrarily in each of the liquid paths. In this embodiment, the liquid outlets 40224 are spaced uniformly and circumferentially. This arrangement allows the liquid to pass through the filter cover 4022 uniformly from all directions, and promotes even sprayed-out liquid during a high-speed spray and achieve a great filtering effect on the liquid. When parts of the liquid outlets 40224 are accidentally blocked, the remaining liquid outlets 40224 can maintain normal operation.

Preferably, in this embodiment, the above-mentioned two liquid paths are provided on the filter plate 40222, and one end of the elastic element 7 is pressed against and positioned between the two liquid paths. In this embodiment, a rounded corner is formed between the filter plate 40222 and the cylinder 40221, and accordingly, the liquid outlets 40224 can also be disposed in the rounded corner.

Further, a gas vent 601 is provided through a wall of the tube 6 and positioned above the sealing ring 4014. A recess 602 is arranged in the inner wall of the tube 6 and positioned below the gas vent 601. When the sealing ring 4014 moves to the recess 602, a second gap is formed between the sealing ring 4014 and the recess 602, allowing the gas to pass through.

In this embodiment, the outer cap 3 comprises a first connection 301 and a second connection 302, each of the first connection 301 and the second connection 302 is provided with a cavity, and first connection 301 has an opening on the top of the while the second connection 302 has an opening at the bottom; the upper end of the tube 6 engages with an inner wall of the cavity of the first connection 301, and the upper pump component 401 extends through the opening on the top of the first connection 301; and the second connection 302 is configured to be connected with a bottle body, wherein the bottle body communicates with the gas vent 601 when being fixedly connected to the second connection 302. In addition to the configurations described above, in this embodiment, the outer cap 3 can also adopt other forms known in the prior art. Its main functions are to form a fixedly connection and seal with the tube 6, as well as to connect and seal with the bottle body, etc. For example, the outer cap 3 can be connected and fixed to other components by means such as snap-fit connections, threaded connections, etc. Further, in this embodiment, a gasket 10 is provided in the cavity of the second connection 302 of the outer cap 3 to improve the sealing effect at the bottleneck of the bottle body.

When the push button 1 is pressed initially, the gas inside the tube 6 must be discharged to create a relatively negative-pressure environment inside the tube 6. This allows the liquid inside the bottle body to flow in the inner cavity of the tube 6 through the one-way valve 8 under the pressure differential. When the push button 1 is pressed again, the pump assembly 4 moves downward, increasing the pressure inside the inner cavity of the tube 6 to a certain level. The liquid then drives to separate the sealed engagement between the upper end of the rod 4021 of the lower pump component 402 and the lower end of the liquid passage 4011 of the liquid channel, resulting in a high-speed spray. After the liquid is sprayed out, the external pressure is removed. The pump assembly 4 and the push button 1 move upward to their original positions under the elastic force of the elastic element 7. The pressure inside the inner cavity of the tube 6 instantly decreases, allowing the liquid in the bottle body to once more flow in the inner cavity of the tube 6 through the one-way valve 8, thus preparing for the next pressing and spraying.

To better achieve the gas exhaust of the inner cavity of the tube 6 during initial use and maintain the pressure balance inside the bottle body during subsequent use, in this embodiment, the recess 602 and the gas vent 601 are disposed in the tube 6. Specifically, when the push button 1 is pressed to move the sealing ring 4014 on the upper pump component 401 to the recess 602, a second gap is formed between the sealing ring 4014 and the recess 602 to allow the gas to pass through. This enables the gas inside the tube 6 to be discharged sequentially through the recess 602, the gas vent 601, and a third gap between the upper pump component 401 and the locking cap 5. Subsequently, the upper pump component 401 is separated from the locking cap 5 after moving downward. Therefore, the bottle body communicates successively with the gas vent 601 and the third gap between the upper pump component 401 and the locking cap 5, to establish the communications between the bottle body and external atmospheric pressure, which achieves the pressure balance inside the bottle body. This also ensures that the liquid can flow in the tube 6 when the internal pressure of the tube 6 is decreased. After the external pressure is removed, the upper pump component 401 moves upward to the original position where it is pressed again by the locking cap 5. The mutual engagement between the locking cap 5 and the upper pump component 401 re-forms a sealing effect, preventing potential leakage of the liquid inside the bottle body therethrough.

In this embodiment, all the components of the atomizing dispenser are made of plastic materials. In this way, all the components of the atomizing dispenser in this embodiment can be conveniently recycled. The plastic materials are particularly suitable for recycling, while the manufacturing costs remain low. All the components of the atomizing dispenser include the push button 1, the nozzle 2, the pump assembly 4, the tube 6, the elastic element 7, the one-way valve 8, the outer cap 3, the locking cap 5, etc.

Figure 9:
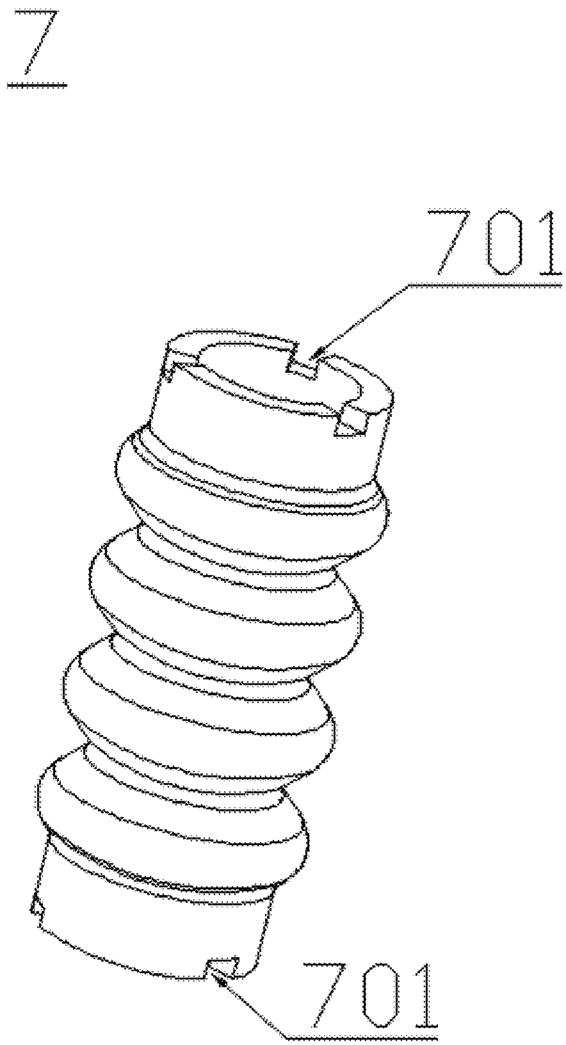
FIG. 9 is a perspective view of an elastic element.

In this embodiment, the elastic element 7 is a plastic spring, and a notch 701 is disposed on an edge of the plastic spring and it may be a through hole or a slot, as shown in FIG. 9. The notch 701 allows the liquid entering an inner cavity of the plastic spring through the one-way valve 8 to further flow into the internal space between the plastic spring and the inner wall of the tube 6. In this way, when the plastic spring is adopted as the elastic element 7, the internal space of the inner cavity of the tube 6 can be fully utilized to maximize more liquid storage, thereby increasing a spray volume.

The inner wall of the tube 6 in this embodiment is further provided with a limiting step 603, which is configured to limit a downward movement distance of the upper pump component 401. A stop 604 protruding radially inward is provided on and adjacent to the lower end of the tube 6, and the stop 604 is configured to limit the one-way valve 8 to prevent the one-way valve 8 from release.

Further, in this embodiment, a liquid inlet 605 is provided through the wall and at the bottom of the tube 6, and the one-way valve 8 is correspondingly disposed at the liquid inlet 605. The one-way valve 8 is configured to limit the backflow of the liquid, allowing the liquid to flow into the inner cavity of the tube 6 through the liquid inlet 605. A pipette 9 is configured to connect with the tube 6 and it can be inserted into the bottle body to convey perfumes, liquid medicines or other liquids intended for atomized spray from the bottle body in to into the tube 6.

Embodiment 2

This embodiment differs from embodiment 1 in that all or certain components of the atomizing dispenser in this embodiment are made of metal materials. For example, the elastic element 7 is a metal spring.

Embodiment 3

This embodiment discloses a bottle, including a bottle body and the atomizing dispenser with a filtering structure according to embodiments 1 or 2.

Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The above description is only intended to show the preferred embodiments of the present disclosure and is not intended to limit the present disclosure in any form. Therefore, any modifications, equivalent changes and variations made to the above embodiments based on the technical essence of the present disclosure without departing from the contents of the technical solutions of the present disclosure still fall within the scope of the technical solutions of the present disclosure.

For the sake of clarity, it is to be understood that the use of 'a' or 'an' throughout this application does not exclude a plurality, and 'comprising' does not exclude other steps or elements.

The invention claimed is:

1. An atomizing dispenser with a filtering structure, comprising a push button, a nozzle, a pump assembly, a tube, and an elastic element; the nozzle being provided in the push button, and the pump assembly being provided in an inner cavity of the tube, wherein the pump assembly comprises an upper pump component and a lower pump component; the upper pump component being provided with a liquid channel in fluid communication with the nozzle and a sealing ring configured to seal and press against an inner wall of the tube, and the lower pump component being provided with a filter cover for filtering impurities in a liquid, wherein the filter cover is provided with a plurality of liquid outlets; the elastic element is positioned between a bottom of the inner wall of the tube and the filter cover; under non-working condition of the elastic element, the lower pump component presses against the upper pump component by an elastic force of the elastic element, to close the liquid channel; and a one-way valve is disposed at the bottom of the inner cavity of the tube to allow the liquid to flow in, wherein the upper pump component and the lower pump component are coaxial; the liquid channel comprises a liquid passage in fluid communication with a nozzle and a connection passage positioned below and in communication with the liquid passage, wherein the connection passage has a larger inner diameter than the liquid passage; the lower pump component further comprises a rod embedded in the connection passage, wherein a first gap is formed between the rod and a an inner wall of the connection passage, and the filter cover is connected to a lower end of the rod; and under non-working condition of the elastic element, an upper end of the rod presses against a lower end of the liquid passage by the elastic force of the elastic element, to form a seal.

2. The atomizing dispenser with a filtering structure according to claim 1, wherein the sealing ring is connected to a lower end of the upper pump component and is in single line contact with the inner wall of the tube.

3. The atomizing dispenser with a filtering structure according to claim 1, the dispenser further comprises a locking cap for preventing the pump assembly from ejection; the locking cap is assembled and fixed on the tube and is provided with a space to enable the upper pump component to pass through; an outer wall of the upper pump component is provided with a first limit extending radially and outward, and the locking cap is provided with a second limit narrowing radially and inward; and under non-working condition, the second limit blocking the first limit to prevent the pump assembly from ejection.

4. The atomizing dispenser with a filtering structure according to claim 1, wherein the filter cover comprises a filter plate where the liquid outlets are arranged on.

5. The atomizing dispenser with a filtering structure according to claim 4, wherein the filter cover further comprises an extension cylinder connected with the filter plate and extending downward.

6. The atomizing dispenser with a filtering structure according to claim 5, wherein the filter cover further comprises a cylinder connected with the filter plate and extending upward, and an inner cavity of the cylinder is communicated with an inner cavity of the extension cylinder.

7. The atomizing dispenser with a filtering structure according to claim 1, wherein the plurality of liquid outlets are configured to form one or more liquid paths, wherein the plurality of liquid outlets are arranged and distributed circumferentially in each of the liquid paths, and each of the liquid paths is arranged circumferentially with a same center.

8. The atomizing dispenser with a filtering structure according to claim 7, wherein two liquid paths are provided, and one end of the elastic element is pressed and positioned between the two liquid paths.

9. The atomizing dispenser with a filtering structure according to claim 1, wherein a gas vent is provided through a wall of the tube and positioned above the sealing ring; a recess is arranged on the inner wall of the tube and positioned below the gas vent, and when the sealing ring moves to the recess, a second gap is formed between the sealing ring and the recess, allowing the gas to pass through.

10. The atomizing dispenser with a filtering structure according to claim 9, further comprising an outer cap, wherein the outer cap comprises a first connection and a second connection, each of the first connection and the second connection is provided with an internal cavity, and the first connection has an opening on the top while the second connection has an opening at the bottom; the tube engages with an inner wall of the cavity of the first connection, and the upper pump component extends through the opening at the top of the first connection; and the second connection is configured to be connected with a bottle body, wherein the bottle body communicates with the gas vent when being fixedly connected to the second connection.

11. The atomizing dispenser with a filtering structure according to claim 1, wherein all the components of the atomizing dispenser are made of plastic materials.

12. A bottle, comprising a bottle body and the atomizing dispenser with a filtering structure according to claim 1.

* * * * *